(12) United States Patent
Sivahop (10) Patent No.: US 7,163,180 B2
(45) Date of Patent: Jan. 16, 2007

(54) SYSTEM AND METHOD FOR ROUTING CABLES

(75) Inventor: Raymond R. Sivahop, Plano, TX (US)

(73) Assignee: MCI, LLC, Basking Ridge, NJ (US)

( * ) Notice: Subject to any disclaimer, the term of this patent is extended or adjusted under 35 U.S.C. 154(b) by 118 days.

(21) Appl. No.: 10/860,257

(22) Filed: Jun. 3, 2004

(65) Prior Publication Data

US 2005/0269460 A1    Dec. 8, 2005

(51) Int. Cl.
*F16L 3/00*    (2006.01)
(52) U.S. Cl. ............................. 248/49; 174/40 R
(58) Field of Classification Search .............. 174/40 R; 248/49, 75, 89, 90, 91, 68.1
See application file for complete search history.

(56) References Cited

U.S. PATENT DOCUMENTS

| | | | |
|---|---|---|---|
| 6,455,780 B1 * | 9/2002 | Bellanger | 174/101 |
| 6,629,675 B1 | 10/2003 | Bjorklund et al. | |
| 6,724,970 B1 * | 4/2004 | Adapathya et al. | 385/135 |

* cited by examiner

*Primary Examiner*—Ramon O Ramirez (57) ABSTRACT

A system and method for routing and segregating cables is provided. An embodiment includes a support member having a plurality of cable trays coupled thereto. The cable trays may be arranged in a tiered-manner such that cable receiving portions of the cable trays extend farther than an adjacent cable tray in a longitudinal direction. Cables may then be routed to individual cable trays, which route the cables to a second location. In this manner, the cables in each cable tray are segregated from cables in other cable trays, thereby reducing the twisting of the cables.

21 Claims, 6 Drawing Sheets

SYSTEM AND METHOD FOR ROUTING CABLES

TECHNICAL FIELD

The present invention relates generally to a system and method for supporting and routing cables, and more particularly, to a system and method for supporting and routing multiple cables in an organized and segregated manner.

BACKGROUND

Many types of electronic components, such as servers, telecommunications equipment, junction boxes, racks/cabinets of electrical components, and the like, typically have multiple connections for cables to transmit and receive a variety of electrical, optical, data, voice, video, power, and the like, signals. It is common in such an installation to have one or more locations to which many cables are to be routed. In these types of applications, weaving and braiding is a common problem, causing the cables to become twisted and disorganized.

For example, telecommunications services are often provided by racks of equipment housed within cabinets. Each rack typically contains multiple slots capable of supporting a variety of cards, such as line cards, application specific cards, multiplexing/demultiplexing cards, DTMX cards, power supply cards, processing cards, controller cards, and the like, wherein each rack of cards may have capacity to support 512 or more cable connections. In this situation, the wires twisted together become difficult to identify and isolate. Thus, performing maintenance and/or provisioning activities that require a technician to modify the cabling, such as testing line conditions, troubleshooting line problems, accommodating service changes (e.g., changing bandwidth between OC-192, C-48, OC-12, OC-3, Gigabit Ethernet, and the like) is error prone.

This is particularly troublesome when the maintenance and/or provisioning activities are performed without taking the entire rack and/or cabinet out of service. In these situations, other cards within the rack and/or cabinet may be in active service, handling actual user traffic. Disconnecting an incorrect cable in this situation may disrupt service, causing a loss of service and loss of revenue to a commercial service provider. Thus, there is a need for a system and method of supporting, organizing, and segregating cables such that braiding and weaving of the cables is reduced, thereby allowing a technician easier access to the cables.

SUMMARY OF THE INVENTION

These and other problems are generally solved or circumvented, and technical advantages are generally achieved, by preferred embodiments of the present invention which provides a system and method for supporting, organizing, and segregating multiple cables.

In accordance with an embodiment of the present invention, a cable routing apparatus is provided. The cable routing apparatus includes a support member having a first longitudinal edge and a second longitudinal edge, and a plurality of cable trays coupled to the support member such that at least some of the cable trays are substantially parallel to each other, the at least some of the cable trays being positioned such that a cable-receiving portion of each cable tray extends farther than an adjacent cable tray positioned closer to the first longitudinal edge.

In accordance with another embodiment of the present invention, a cable routing apparatus is provided. The cable routing apparatus includes a support member and a plurality of cable trays coupled to the support member, each cable tray having a cable-receiving end and being mounted to the support member such that the cable trays are substantially parallel to each other and the cable-receiving end of each cable tray is offset along a longitudinal axis of the support member from an adjacent cable tray.

In accordance with another embodiment of the present invention, a cable routing apparatus is provided. The cable routing apparatus includes a support member having a first edge and a second edge, and a plurality of cable trays coupled to the support member, the plurality of cable trays being positioned in a first section and a second section, the cable trays in each of the first section and the second section being coupled to the support member such that a first cable tray extends farther in a longitudinal direction than a second cable tray positioned closer to the first edge of the support member.

In accordance with another embodiment of the present invention, a method for routing cables is provided. The method includes connecting a first cable to a first component, routing the first cable to a first cable tray, connecting a second cable to a second component, and routing the second cable to a second cable tray, wherein the second cable tray is parallel to the first cable tray, wherein each of the first cable tray and the second cable tray has a cable-receiving end, and wherein the cable-receiving end of the second cable tray extends beyond the cable-receiving end of the first cable tray in a longitudinal direction.

It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to embodiments in a specific context, namely, providing cable routing for a rack of equipment contained within a cabinet, such as rack-mounted equipment that is commonly used within the telecommunications industry. Embodiments of the present invention, however, may be used to provide routing for any flexible conduit, such as ribbons, conduits carrying liquids or gas, fiber optical cables, single-threaded wires, multi-threaded wires, or the like. Furthermore, while applications using embodiments of the present invention are discussed in terms of routing cables to and from cards mounted in a rack of a cabinet, embodiments of the present invention are equally applicable to any situation in which one or more cables are to be routed. For example, embodiments of the present invention may be used to route cables in junction boxes, electrical cabinets, valve racks, electrical racks, ladder racks, or the like.

Figure 1:
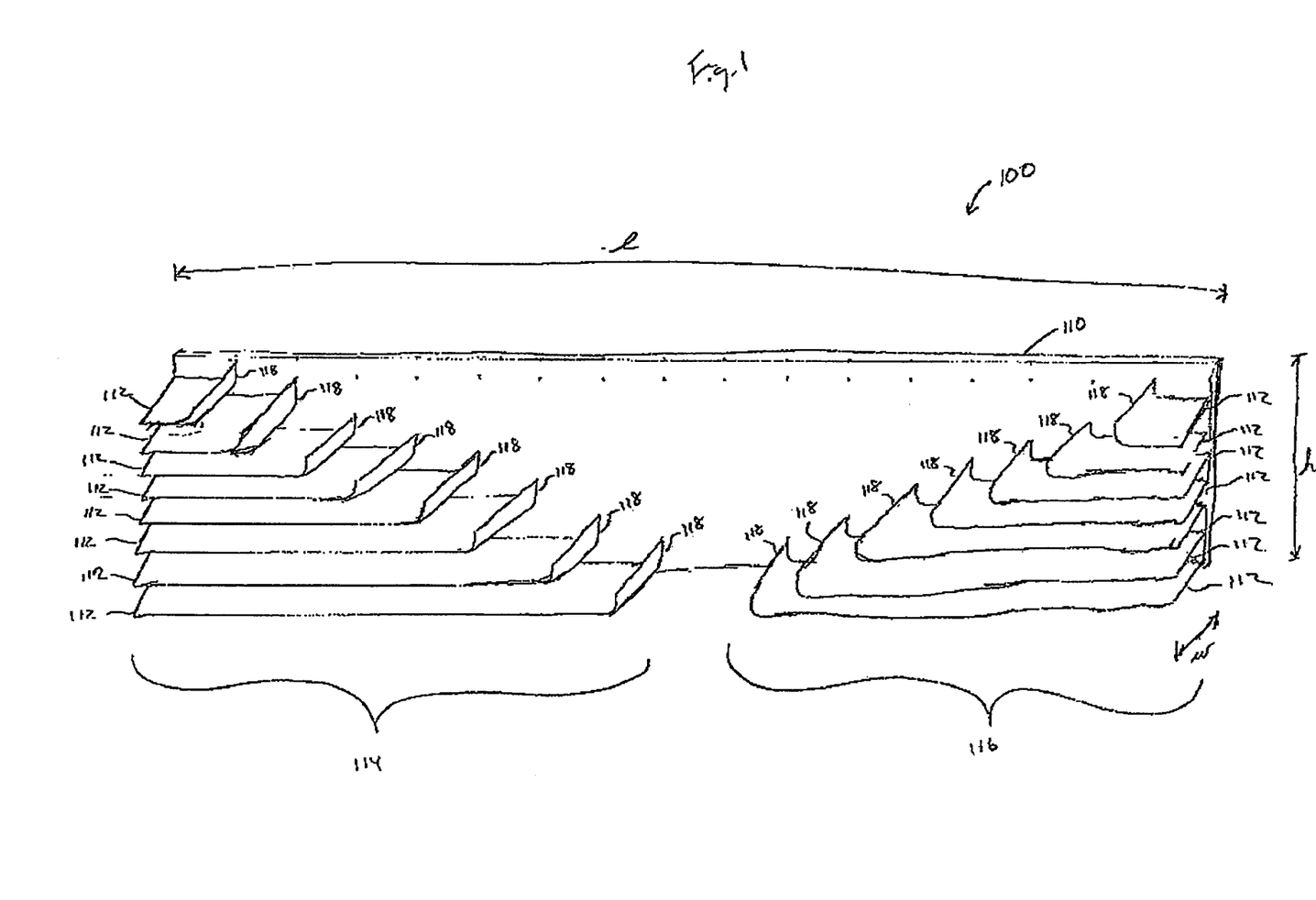
FIG. 1 is a perspective view of an embodiment of the present invention.

FIG. 1 is a perspective view of an embodiment of the present invention. As illustrated in FIG. 1, a cable segregation tray 100 includes a support member 110 with a plurality of cable trays 112 attached thereto. In an embodiment, the cable trays 112 are attached to the support member 110 such that an angle formed between a major surface of the support member 110 and a major surface of each of the cable trays 112 is about 45 degrees to about 90 degrees.

The cable trays 112 may be arranged into a first section 114 and a second section 116. Cable trays 112 in each of the first section 114 and the second section 116 are attached to the support member 110 such that the cable trays 112 in each of the first section 114 and the second section 116 are substantially parallel. In each of the first section 114 and the second section 116, each cable tray 112 has a cable-receiving end 118 that extends farther toward the middle than cable trays 112 positioned above it. Accordingly, a tiered or stepped arrangement is formed as illustrated in FIG. 1. It should also be noted that the cable-receiving end 118 may include a lip with a rounded corner to help prevent damage to cables.

The embodiment illustrated in FIG. 1 provides fifteen cable trays 112, eight cable trays 112 in the first section 114 and seven cable trays in the second section 116 for illustrative purposes only. An embodiment as illustrated in FIG. 1 may be used to route cables coupled to cards mounted in a rack of a cabinet. A typical rack of equipment is capable of holding seventeen total cards. The fifteen trays plus the ability to route cables attached to the center two cards below the bottom two cable trays 112 provides seventeen segregated paths to route cables. This embodiment is discussed below with reference to FIG. 2. Other embodiments may have more or fewer cable trays, and other embodiments may comprise cable trays that route cables to only one side (e.g., only a first section 114 or only a second section 116).

The support member 110 and the cable trays 112 may be fabricated from a variety of materials, including metals (e.g., steel, aluminum, or the like), plastics, a combination thereof, or the like, and may have a substantially planar surface, a corrugated surface, grooved (e.g., U-shaped, W-shaped, V-shaped, or the like), or the like. For example, the support member 110 and/or the cable trays 112 may be fabricated by using extrusion, injection molding, welding, forming, heating, or the like processes. Furthermore the support member 110 and the cable trays 112 may be fabricated as multiple pieces or a single unit. It should also be noted that the support member 110 and the cable trays 112 may incorporate one or more features of the other.

Additionally, the cable trays 112 may be solid, slotted, meshed, or the like. In an embodiment, the support member 110 and the cable trays 112 have a solid, substantially planar surface and are fabricated from $\frac{1}{16}$ inch thick plate metal.

The cable trays 112 and/or the support member 110 may be coated with paint, a non-conductive material (such as Dip-It™), an anti-oxidant, or the like.

The cable trays 112 may be attached to the support member 110 by any suitable method, such as welded, glued, screwed, bolted, or the like. In an embodiment, the cable trays 112 are attached to the support member 110 by locking tabs. In this embodiment, the cable trays may be easily adjusted to accommodate different configurations and cable sizes or quantities.

The cable segregation tray 100 may have a length that enables it to span a distance in which the cables are desired to be routed. In an embodiment in which the present invention is utilized to route cables from rack-mounted cards to a side of a cabinet in which the racks are mounted, for example, the cable segregation tray 100 may have a length approximately equal to the width of the rack plus or minus a sufficient width to enable easy routing within a specific cabinet. For example, a typical rack used in the industry is capable of holding sixteen 1 inch cards and one 1.5 inch card. In this example, an embodiment of the cable segregation tray 100 may have a length l about 19 inches, a height h about 1.75 inches, and a width w about $2\frac{1}{16}$ inches.

Figure 2:
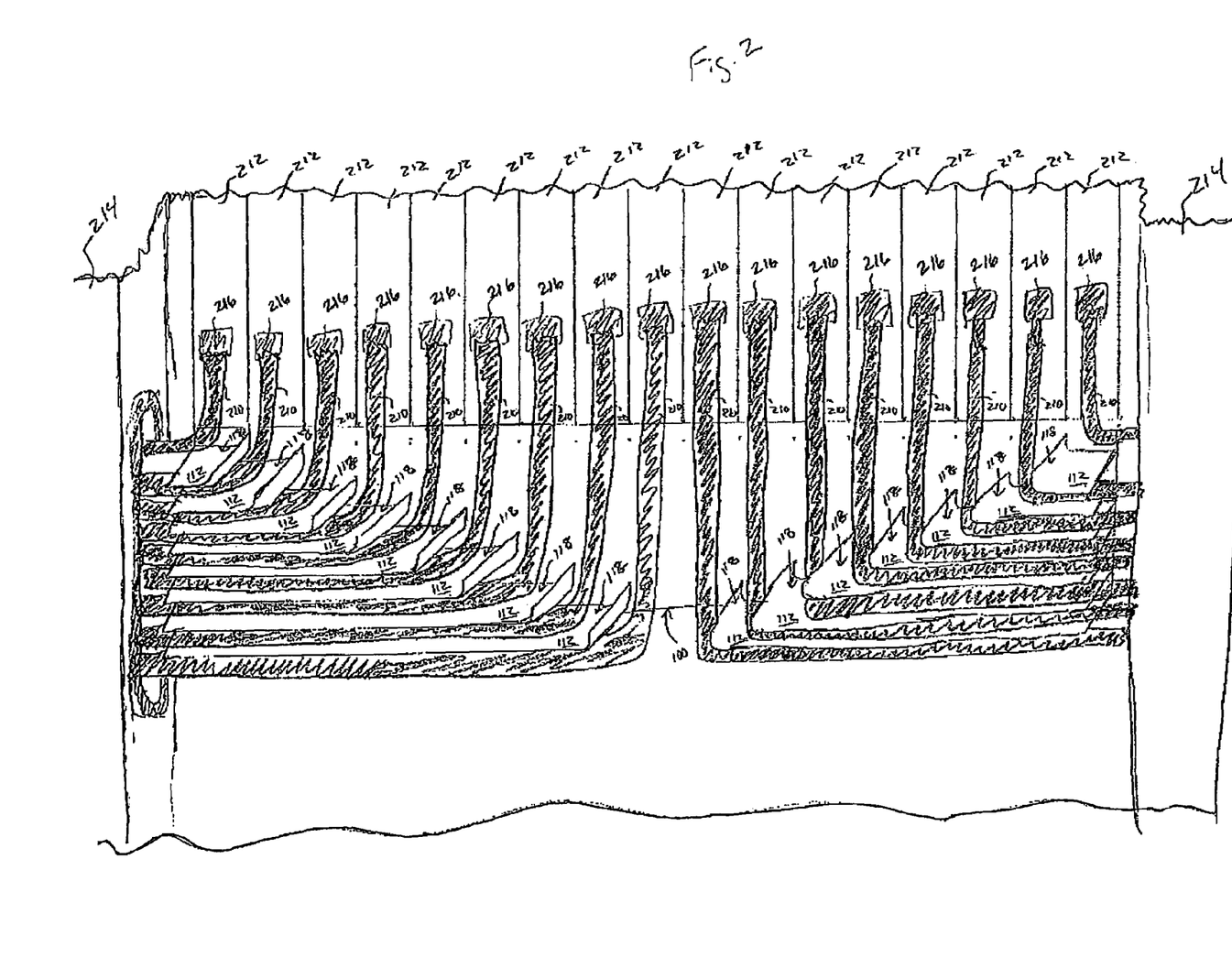
FIG. 2 shows an application of an embodiment of the present invention.

FIG. 2 shows an application of an embodiment of the present invention. The application illustrated in FIG. 2 comprises the situation in which the embodiment illustrated in FIG. 1 is utilized for arranging cables 210 attached to a rack of cards 212 mounted in a cabinet 214, wherein like reference numerals refer to like elements. In this embodiment, each cable tray 112 routes cables to/from one of the cards 212. The cable segregation tray 100 may be mounted to the cabinet in any manner sufficient to securely hold the cable segregation tray 100 in place. For example, embodiments of the present invention may be attached to the cabinet by screws, bolts, welds, adhesives, clips, brackets, or the like. In an alternative embodiment, the cable trays 112 may be coupled directly to or integrated into a framework (e.g., a cabinet or other component).

As illustrated in FIG. 2, each of the cables 210 has a connector 216 that couples each cable to one of the cards 212. The cables 210 from each card 212 are routed to the cable-receiving end 118 of the cable tray 100 situated below the cards. The cables 210 are then routed horizontally to a side of the rack, where the cables 210 may be routed according to the type of installation. FIG. 2 illustrates the situation in which the cables 210 are routed to a cable tray running vertically alongside the cabinet 214.

When used in this manner, the horizontal sections of the cable trays prevent the cables routed to a specific card from becoming twisted with cables routed to a different card. Thus, cables may be easily identified, connected, and disconnected without disturbing cables routed to other cards. While FIG. 2 illustrates only one cable being connected to each card, the cable segregation tray 100, may be used to route a plurality of cables from each card. It should also be noted that the cable segregation tray 100 is illustrated as being positioned below the cards for illustrative purposes only. Other installations, however, may mount the cable segregation tray 100 on the left side, on the right side, or above the cards.

Figure 3:
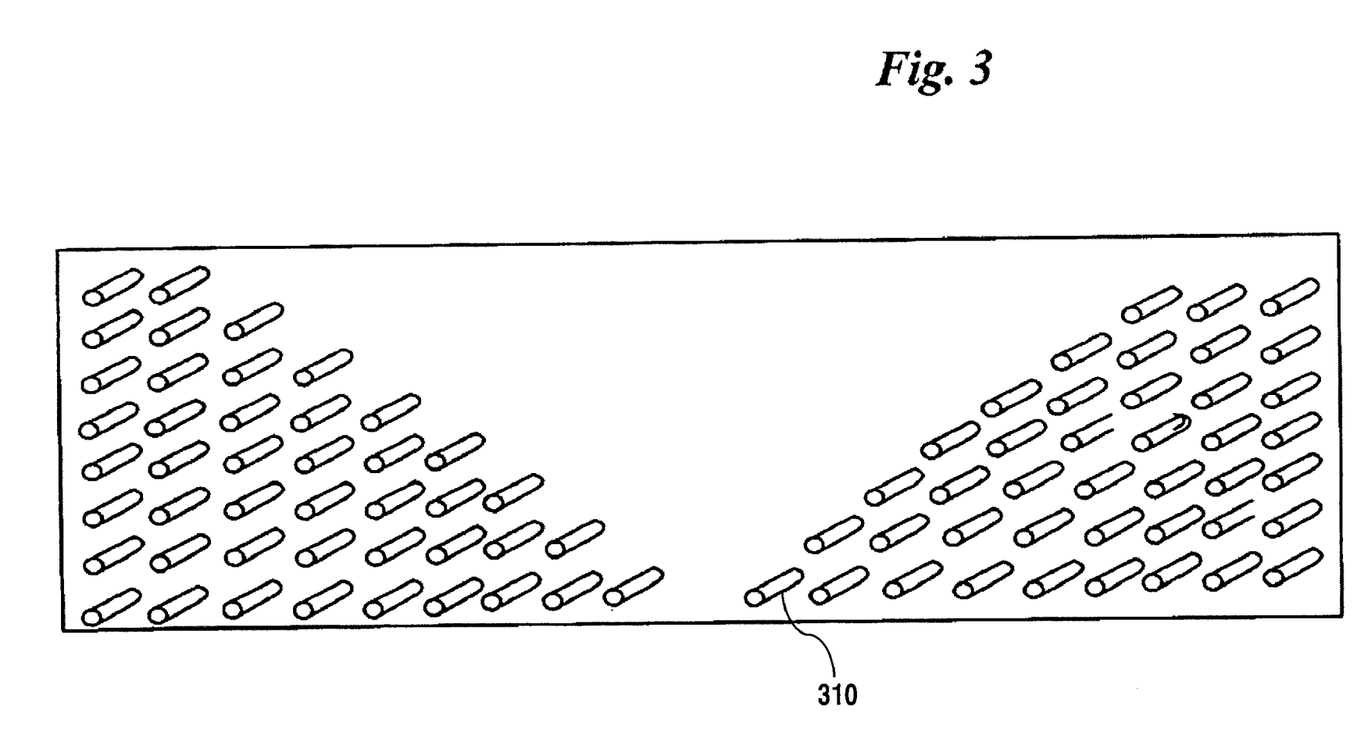
FIGS. 3 and 4 are perspective views of an embodiment of the present invention.
Figure 4:
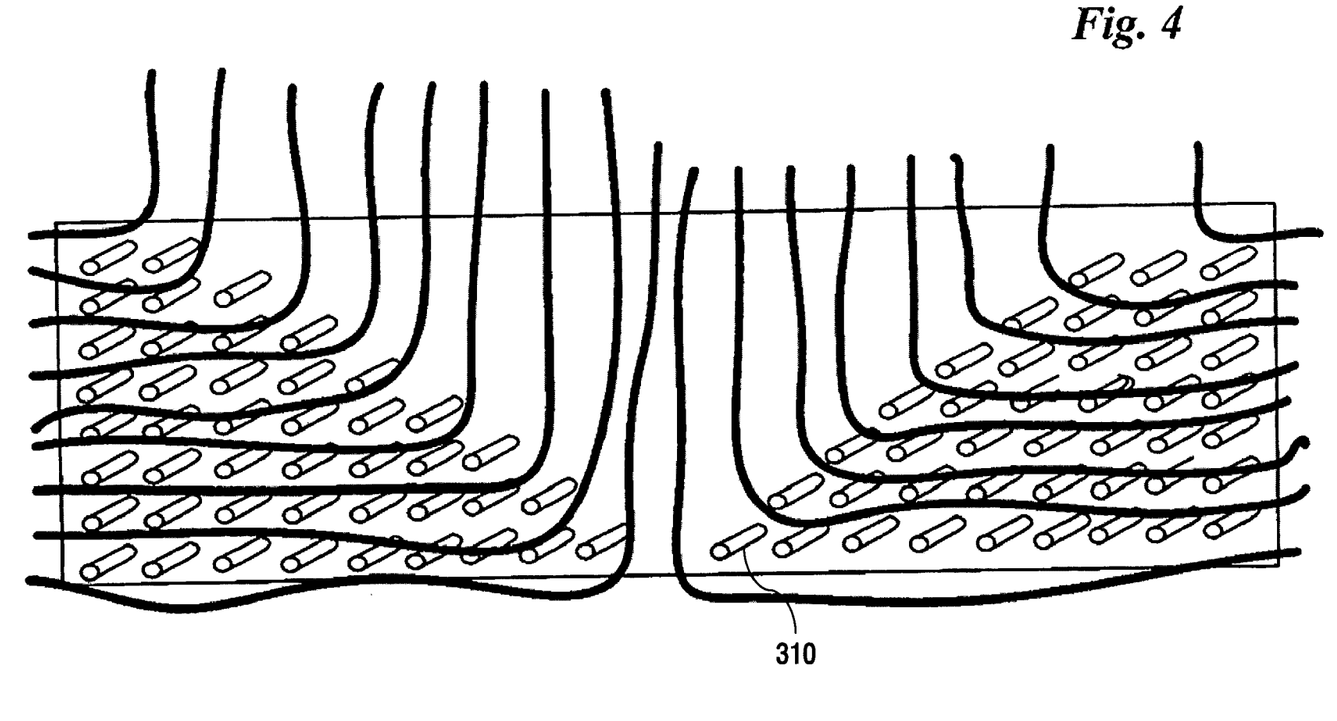

FIGS. 3 and 4 are perspective views of an embodiment of the present invention. In particular, FIG. 3 illustrates an embodiment in which cable trays 112 comprise a plurality of cable support pins 310 rather than the solid, substantially planar member illustrated in FIG. 1, and FIG. 4 illustrates how cables may be routed with such an embodiment. It should be noted that while the cable support pins 310 are illustrated as cylindrical in shape, the cable support pins 310 may have any cross-sectional shape, such as square, rectangular, triangular, semi-circular, or the like. Furthermore, the cable support pins 310 are illustrated as being straight for illustrative purposes only, and accordingly, the cable support pins 310 may be grooved (e.g., U-shaped, W-shaped, V-shaped, or the like), or the like. It should also be noted that the positions and number of the cable-support pins 310 may be varied.

Figure 5:
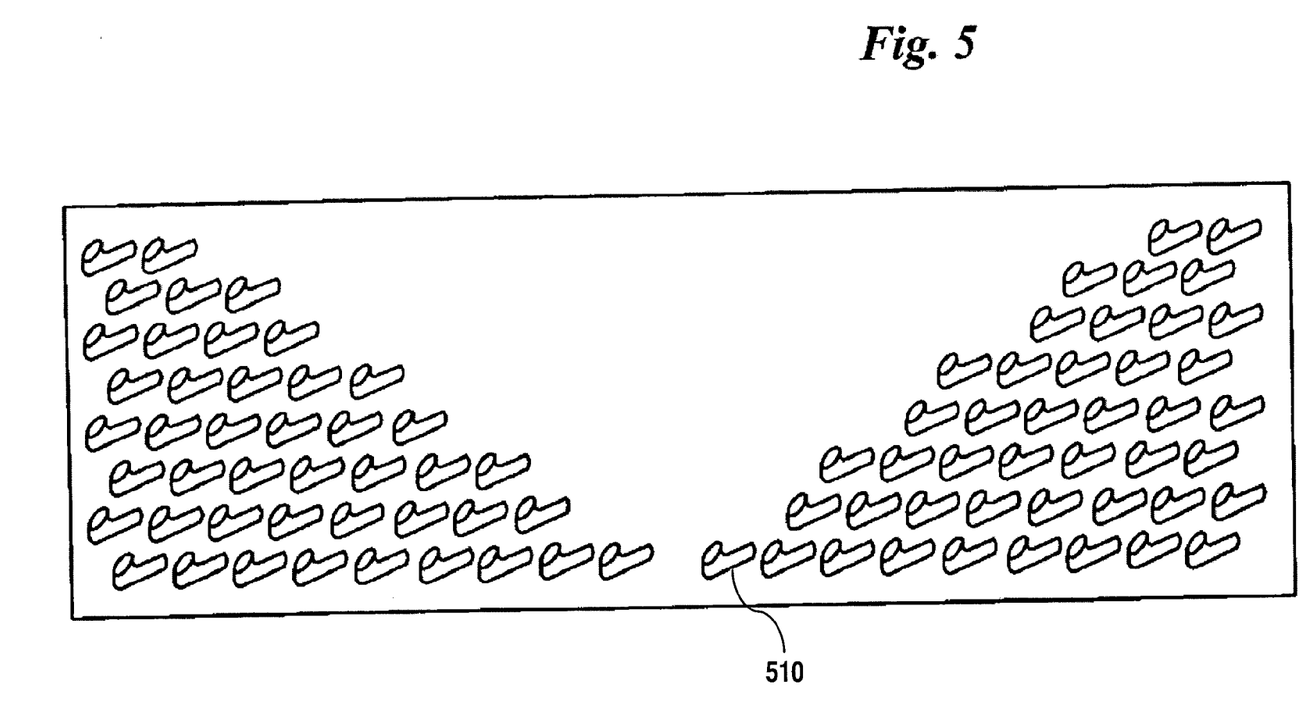
FIGS. 5 and 6 are perspective views of an embodiment of the present invention.
Figure 6:
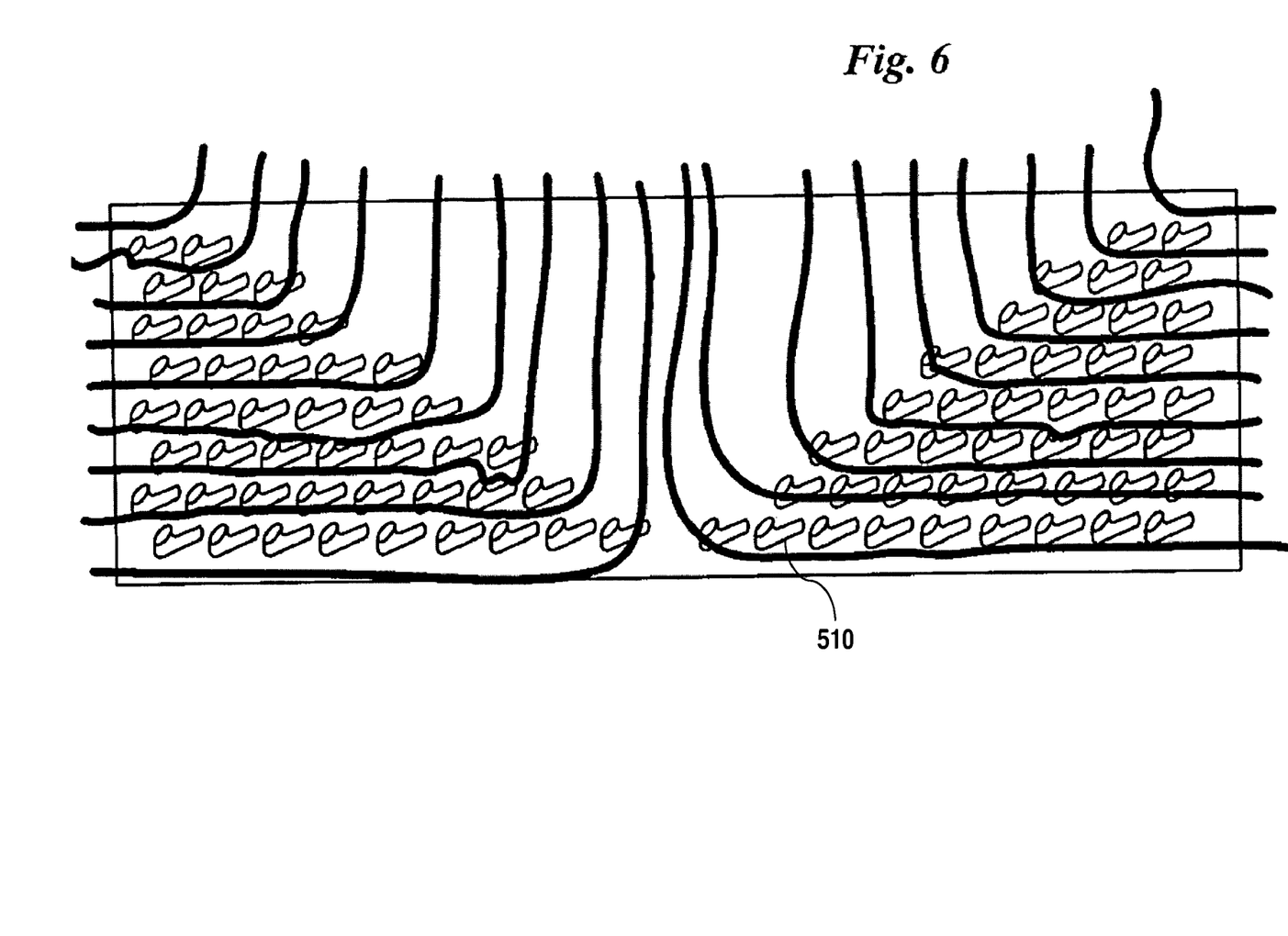

FIGS. 5 and 6 are perspective views of an embodiment of the present invention. In particular, FIG. 5 illustrates an embodiment in which the cable trays 112 (FIG. 1) comprise L-shaped cable support pins 510 rather than the solid, substantially planar member illustrated in FIG. 1, and FIG. 6 illustrates how cables may be routed with such an embodiment. The L-shaped cable support pins 510 help retain the cables on each of the cable support pins 510. Also, the L-shaped cable support pins 510 have been located such that the L-shaped cable support pins 510 are staggered horizontally relative to the cable support pins 510 above and below. In this manner, easier access is possible without interference of the L-shaped cable support pins 510 located above.

Although the present invention and its advantages have been described in detail, it should be understood that various changes, substitutions and alterations can be made herein without departing from the spirit and scope of the invention as defined by the appended claims. For example, embodiments may be fabricated using different methods and different materials. Other embodiments may use different organization of cable trays and different shapes of cable trays may be used while remaining within the scope of the present invention.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A cable routing apparatus comprising:
a support member having a first longitudinal edge and a second longitudinal edge; and
a plurality of cable trays coupled to the support member such that at least some of the cable trays are substantially parallel to each other, wherein a first section of the cable trays is arranged longitudinally with respect to a second section of the cable trays, the at least some of the cable trays being positioned such that a cable-receiving portion of each cable tray extends farther than a cable-receiving portion of an adjacent cable tray positioned closer to the first longitudinal edge, wherein the cable-receiving portion of the each cable tray is configured to receive a cable routed in a direction substantially crossing the first longitudinal edge, substantially vertically to the each cable tray from an electronic device, and to route the cable substantially horizontally to cross a latitudinal edge of the support member.

2. The apparatus of claim 1, wherein the cable-receiving portion comprises a lip with rounded corner.

3. The apparatus of claim 1, wherein each cable tray comprises one or more pins.

4. The apparatus of claim 1, wherein each cable tray comprises one or more L-shaped pins.

5. The apparatus of claim 1, wherein the cable routing apparatus is formed of a metal, plastic, or a combination thereof.

6. The apparatus of claim 1, wherein an angle formed between a major surface of the cable trays and a major surface of the support member is between about 45 degrees and about 90 degrees.

7. The apparatus of claim 1, wherein the lengths of the respective cable trays within the first section are identical to the lengths of the respective cable trays within the second section.

8. The apparatus of claim 1, wherein each of the at least some of cable trays is substantially flat until the cable-receiving portion.

9. A cable routing apparatus comprising:
a support member; and
a plurality of cable trays coupled to the support member, wherein a first section of the cable trays is arranged longitudinally with respect to a second section of the cable trays, each cable tray having a cable-receiving end and being mounted to the support member such that the cable trays are substantially parallel to each other and the cable-receiving end of each cable tray is offset along a longitudinal axis of the support member from an adjacent cable tray, wherein the cable-receiving end of the each cable tray is configured to receive a cable routed in a direction substantially crossing a longitudinal edge of the support member.

10. The apparatus of claim 9, wherein the cable-receiving end comprises a rounded corner.

11. The apparatus of claim 9, wherein each cable tray comprises one or more pins.

12. The apparatus of claim 9, wherein each cable tray comprises one or more L-shaped pins.

13. The apparatus of claim 9, wherein the cable routing apparatus is formed of a metal, plastic, or a combination thereof.

14. The apparatus of claim 9, wherein an angle formed between a major surface of the cable trays and a major surface of the support member is between about 45 degrees and about 90 degrees.

15. A cable routing apparatus comprising:
a support member having a first edge and a second edge; and
a plurality of cable trays coupled to the support member, the plurality of cable trays being positioned in a first section and a second section, wherein the first section is arranged longitudinally with respect to the second section, the cable trays in each of the first section and the second section being coupled to the support member such that a first cable tray extends farther in a longitudinal direction than a second cable tray positioned closer to the first edge of the support member, wherein a cable-receiving portion of the each cable tray is configured to receive a cable routed in a direction substantially crossing the first edge.

16. The apparatus of claim 15, wherein a cable-receiving end of the cable trays comprises a rounded corner.

17. The apparatus of claim 15, wherein each cable tray comprises one or more pins.

18. The apparatus of claim 15, wherein each cable tray comprises one or more L-shaped pins.

19. The apparatus of claim 15, wherein the cable routing apparatus is formed of a metal, plastic, or a combination thereof.

20. The apparatus of claim 15, wherein an angle formed between a major surface of the cable trays and a major surface of the support member is between about 45 degrees and about 90 degrees.

21. The apparatus of claim 15, wherein the support member is configured for attachment to an electronic equipment rack.

* * * * *